US012799915B2

(12) United States Patent
Ouchi et al.

(10) Patent No.: US 12,799,915 B2
(45) Date of Patent: Nov. 17, 2026

(54) ELECTROMAGNETIC FUEL INJECTION VALVE

(71) Applicant: HITACHI ASTEMO, LTD., Hitachinaka (JP)

(72) Inventors: Norihide Ouchi, Hitachinaka (JP); Yuya Suzuki, Hitachinaka (JP); Yasuhiko Nabeshima, Hitachinaka (JP); Kohei Azuma, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 18/690,317

(22) PCT Filed: Oct. 25, 2022

(86) PCT No.: PCT/JP2022/039775
§ 371 (c)(1),
(2) Date: Jul. 6, 2026

(87) PCT Pub. No.: WO2023/119852
PCT Pub. Date: Jun. 29, 2023

(65) Prior Publication Data

US 2025/0341195 A1 Nov. 6, 2025

(30) Foreign Application Priority Data

Dec. 24, 2021 (JP) ................................ 2021-211575

(51) Int. Cl.
*F02M 61/16* (2006.01)
*F02M 51/06* (2006.01)

(52) U.S. Cl.
CPC ........ *F02M 61/165* (2013.01); *F02M 51/061* (2013.01); *F02M 2200/27* (2013.01)

(58) Field of Classification Search
CPC ...... F02M 37/48; F02M 51/061; F02M 61/16; F02M 61/165; F02M 61/168; F02M 2200/27
See application file for complete search history.

(56) References Cited

U.S. PATENT DOCUMENTS

| | | | | |
|---|---|---|---|---|
| 4,608,166 A * | 8/1986 | Cain | ...................... | B01D 29/23 D23/209 |
| 2007/0227984 A1* | 10/2007 | Wells | .................. | F02M 61/165 210/450 |
| 2011/0192378 A1* | 8/2011 | Kannan | ................ | F02M 55/025 123/468 |

FOREIGN PATENT DOCUMENTS

| | | | |
|---|---|---|---|
| DE | 102009000183 A1 * | 7/2010 | ............. F02M 55/04 |
| DE | 102013225820 A1 * | 6/2015 | ........... F02M 61/165 |

(Continued)

*Primary Examiner* — Darren W Gorman
(74) *Attorney, Agent, or Firm* — Carrier, Shende & Associates P.C.; Fulchand P. Shende; Joseph P. Carrier

(57) ABSTRACT

In an electromagnetic fuel injection valve (I), when a fuel filter (20) and an orifice member (21) are press-fitted onto an inner peripheral surface of the fuel inlet cylinder part (7), interference between press-fit tolerances of the fuel filter (20) and the orifice member (21) is prevented, and reliable press-fitting fixation is ensured. A first press-fitted cylindrical surface (23) onto which the fuel filter (20) is press-fitted, and a second press-fitted cylindrical surface (24) contiguous with an outer end of the first press-fitted cylindrical surface (23) via a stepped part (25) and having a larger diameter than that of the first press-fitted cylindrical surface (23) and onto which the orifice member (21) is press-fitted are formed on the inner peripheral surface of the fuel inlet cylinder part (7).

4 Claims, 3 Drawing Sheets

(56) References Cited

FOREIGN PATENT DOCUMENTS

| | | | | | |
|---|---|---|---|---|---|
| EP | 2884091 | A1 | * | 6/2015 | ........... F02M 61/165 |
| JP | 2004-239245 | A | | 8/2004 | |
| JP | 2007-285283 | A | | 11/2007 | |
| JP | 2014-169668 | A | | 9/2014 | |
| JP | 2022102752 | A | * | 7/2022 | ............. F02M 61/16 |

* cited by examiner

ELECTROMAGNETIC FUEL INJECTION VALVE

TECHNICAL FIELD

The present invention relates to an electromagnetic fuel injection valve used in a fuel supply system of an engine, and particularly, to an improvement in an electromagnetic fuel injection valve in which a fuel distribution cap branched from a fuel rail pipe is fitted onto an outer periphery of a fuel inlet cylinder part of a valve housing via a sealing member, a fuel filter and an orifice member axially adjacent to each other are sequentially press-fitted onto an inner peripheral surface of the fuel inlet cylinder part from an inlet side of the fuel inlet cylinder part, an annular seal groove for mounting the sealing member is provided on an outer peripheral surface of the fuel inlet cylinder part, and the orifice member has an orifice communicating with an inside and an outside of the orifice member.

BACKGROUND ART

Such an electromagnetic fuel injection valve is already known as disclosed in Patent Literature 1 below.

CITATION LIST

Patent Literature

Patent Literature 1: Japanese Patent Application Laid-Open No. 2007-285283

SUMMARY OF INVENTION

Technical Problem

The orifice of the orifice member attenuates pulsation of fuel pressure generated in the fuel rail pipe due to intermittent operation of a fuel pump, intermittent injection of fuel in a plurality of fuel injection valves, or the like during operation of the engine to suppress a change in fuel injection amount of the fuel injection valve caused by the pulsation, and the fuel filter filters introduced fuel of the fuel injection valve.

However, in the fuel injection valve described in Patent Literature 1, inner peripheral surfaces of the fuel inlet cylinder onto which the adjacent fuel filter and orifice member are press-fitted are set to the same diameter. In such a case, interference between press-fit tolerances of the fuel filter and the orifice member makes it difficult to maintain their respective proper press-fit tolerances. For example, in a case where the fuel filter is press-fitted onto the inner peripheral surface of the fuel inlet cylinder, and then the orifice member is press-fitted with a larger press-fit tolerance than that of the fuel filter, the distortion of the inner peripheral surface of the fuel inlet cylinder due to the press-fitting of the orifice member may affect the press-fitting location of the fuel filter. This may result in a reduction in the press-fit tolerance, and a gap may be formed at the press-fitting location of the fuel filter, which may lead to a decrease in the function of the fuel filter.

The present invention has been made in view of such circumstances, and an object thereof is to provide an electromagnetic fuel injection valve that, when a fuel filter and an orifice member are press-fitted onto an inner peripheral surface of a fuel inlet cylinder, prevents interference between press-fit tolerances of the fuel filter and the orifice member and ensures reliable press-fitting fixation for each.

Solution to Problem

In order to achieve the above-described object, a first feature of the present invention is that an electromagnetic fuel injection valve in which a fuel distribution cap branched from a fuel rail pipe is fitted onto an outer periphery of a fuel inlet cylinder part of the valve housing via a sealing member, a fuel filter and an orifice member axially adjacent to each other are sequentially press-fitted onto an inner peripheral surface of the fuel inlet cylinder part from an inlet side of the fuel inlet cylinder part, an annular seal groove in which the sealing member is mounted is provided on an outer peripheral surface of the fuel inlet cylinder part, and the orifice member has an orifice communicating with an inside and an outside of the orifice member, and a first press-fitted cylindrical surface onto which the fuel filter is press-fitted, and a second press-fitted cylindrical surface contiguous with an outer end of the first press-fitted cylindrical surface via a stepped part and having a larger diameter than that of the first press-fitted cylindrical surface and onto which the orifice member is press-fitted are formed on the inner peripheral surface of the fuel inlet cylinder part.

The sealing member corresponds to an O-ring 13 in the embodiment to be described below.

Additionally, in addition to the first feature, a second feature of the present invention is that the orifice member includes a disc-shaped orifice body part having a wall thickness larger than a length of the orifice and press-fitted onto the second press-fitted cylindrical surface, and a press-fitting guide cylinder part cylindrically protruding from an outer peripheral portion of one end surface of the orifice body part, having an outer diameter smaller than an outer diameter of the orifice body part, and fitted (including light press-fitting) to the second press-fitted cylindrical surface prior to the orifice body part, and a flange-shaped outer side end wall of the seal groove is integrally formed on the fuel inlet cylinder part so as to surround the orifice body part.

Further, in addition to the second feature, a third feature of the present invention is that the outer side end wall has a wall thickness larger than a wall thickness of the orifice body part.

Furthermore, in addition to the third feature, a fourth feature of the present invention is that an inner side surface of the orifice body part and an inner peripheral surface of the press-fitting guide cylinder part are connected to each other via a concave curved surface.

Furthermore, in addition to any of the first to fourth features, a fifth feature of the present invention is that the fuel filter and the orifice member are respectively press-fitted onto the first press-fitted cylindrical surface and the second press-fitted cylindrical surface in a state in which facing end surfaces of the fuel filter and the orifice member abut.

According to the first feature of the present invention, even in a case where distortion occurs in the first and second press-fitted cylindrical surfaces due to the press-fitting of the fuel filter onto the first press-fitted cylindrical surface and the press-fitting of the orifice member onto the second press-fitted cylindrical surface, the distortion is blocked by the stepped part between the first and second press-fitted cylindrical surfaces, and there is no interference therebetween. Therefore, it is possible to accurately press-fit the fuel filter and the orifice member onto the inner peripheral surface of the fuel inlet cylinder with their respective proper press-fit tolerances.

According to the second feature of the present invention, in a case where the orifice member is press-fitted onto the second press-fitted cylindrical surface, the small-diameter press-fitting guide cylinder part is fitted to the second press-fitted cylindrical surface as a leading end, and then the large-diameter orifice body part is press-fitted onto the second press-fitted cylindrical surface. Therefore, the press-fitting posture of the orifice body part onto the second press-fitted cylindrical surface can be maintained to a proper posture without inclination. Moreover, since the wall thickness of the orifice body part is set to be larger than the length of the orifice, it is possible to ensure rigidity of the orifice body part and avoid the distortion of the orifice caused by the press-fitting. In addition, since the flange-shaped outer side end wall of the seal groove is integrally formed on the fuel inlet cylinder part so as to surround the orifice body part press-fitted onto the second press-fitted cylindrical surface, the outer side end wall enhances rigidity of the second press-fitted cylindrical surface, which makes it possible to sufficiently enhance a press-fitting fixation force of the orifice body part and the second press-fitted cylindrical surface.

According to the third feature of the present invention, since the outer side end wall of the seal groove has a wall thickness larger than the wall thickness of the orifice body part, and the outer side end wall surrounds the orifice body part press-fitted onto the second press-fitted cylindrical surface, it is possible to avoid the distortion of the second press-fitted cylindrical surface due to the press-fitting of the orifice body part, which may affect the groove bottom of the seal groove, and to ensure a good sealing state between the sealing member and the seal groove.

According to the fourth feature of the present invention, the connection between the inner side surface of the orifice body part and the inner peripheral surface of the press-fitting guide cylinder part via the concave curved surface enhances the fatigue strength at the root of the orifice body part, which makes it possible to maintain the pulsation attenuation function over the long term.

According to the fifth feature of the present invention, even in a case where foreign matter such as burrs occurs within the second press-fitted cylindrical surface due to the press-fitting of the orifice member onto the second press-fitted cylindrical surface, such foreign matter is blocked at the abutting portion of the fuel filter and the orifice member to prevent the entry of the foreign matter into the fuel filter, which makes it possible to avoid clogging of the fuel filter.

DESCRIPTION OF EMBODIMENTS

Embodiments of the present invention will be described with reference to the accompanying FIGS. 1 to 3.

Figure 1:
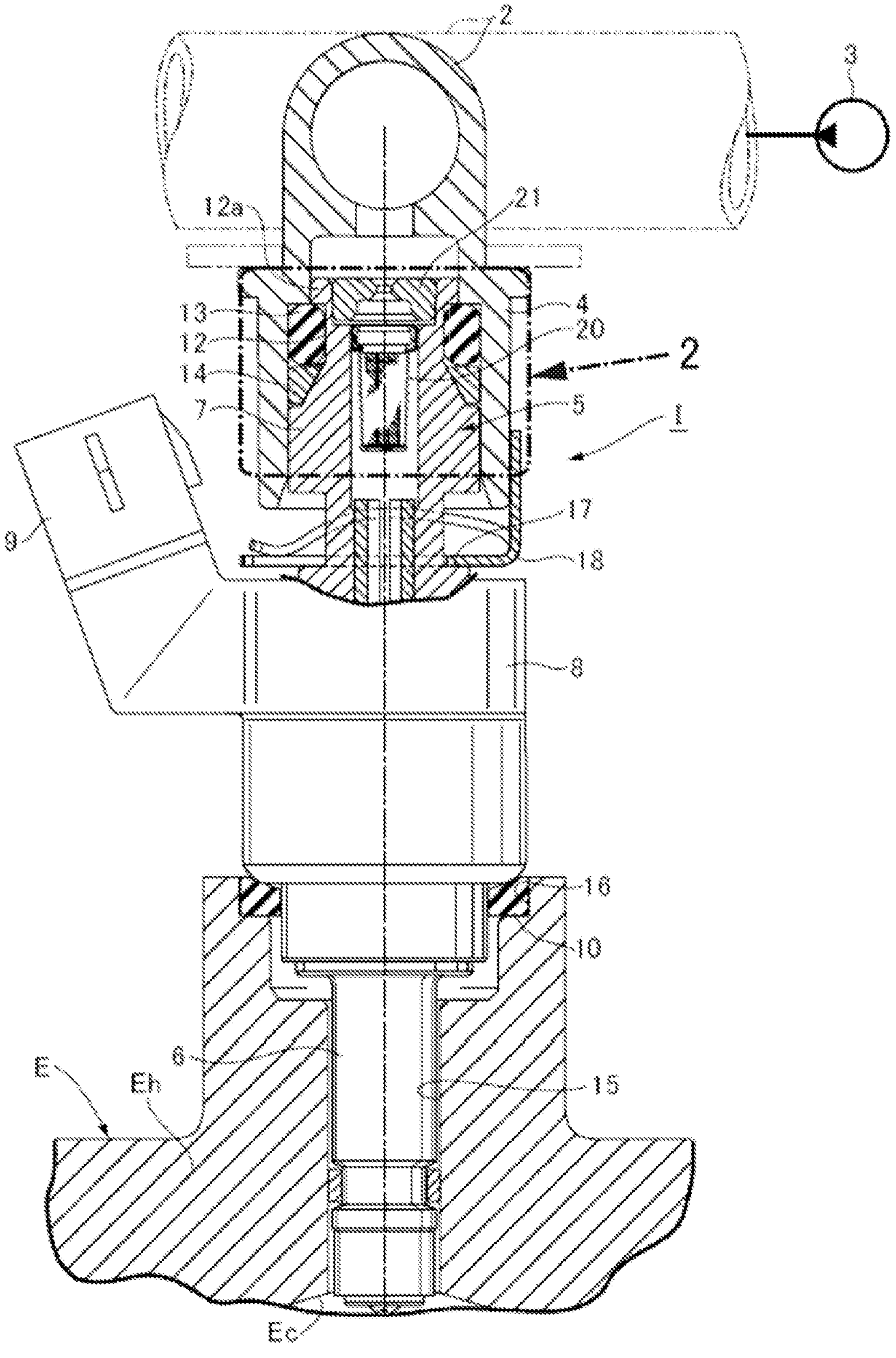
FIG. 1 is a longitudinal sectional view illustrating an electromagnetic fuel injection valve for an internal combustion engine according to the present invention in a mounted state on an engine.

First, in FIG. 1, a plurality of fuel injection valves I (only one is illustrated in the drawing) that can inject fuel into combustion chambers Ec of a plurality of cylinders, and a fuel rail pipe 2 disposed above the fuel injection valves I are attached to a cylinder head Eh of a multi-cylinder engine E. A fuel pump 3 that pressurizes fuel to the fuel rail pipe 2 is connected to one end of the fuel rail pipe 2. In addition, a plurality of fuel distribution caps 4 (only one is illustrated in the drawing) are branched from and formed on the fuel rail pipe 2.

Each fuel injection valve I has a cylindrical valve housing 5 extending along an axis thereof. A front end part of the valve housing 5 is a fuel nozzle cylinder part 6, a rear end part is a fuel inlet cylinder part 7, and an intermediate part is an electromagnetic coil part 8, and the fuel distribution cap 4 is fitted onto an outer periphery of the fuel inlet cylinder part 7 via the O-ring 13, and high-pressure fuel in the fuel rail pipe 2 is supplied to the fuel inlet cylinder part 7 through the fuel distribution cap 4.

The electromagnetic coil part 8 includes a power supply coupler 9 protruding to one side of the electromagnetic coil part 8. When the electromagnetic coil part 8 is energized through the power supply coupler 9, the valve in the fuel nozzle cylinder part 6 is opened, and the high-pressure fuel introduced from the fuel distribution cap 4 into the fuel inlet cylinder part 7 is injected into the combustion chamber Ec.

An annular sealing and cushion member 10 that is in close contact with a front end surface of the electromagnetic coil part 8 is mounted on an outer periphery of the fuel nozzle cylinder part 6. In addition, an annular seal groove 12 is formed on an outer peripheral surface of the fuel inlet cylinder part 7 near an inlet thereof, and the O-ring 13 and a backup ring 14 that supports a front end surface of the O-ring 13 are mounted in the seal groove 12.

Meanwhile, the cylinder head Eh is provided with an injection valve mounting hole 15 of which an inner end is open to a ceiling surface of each combustion chamber Ec and an annular recessed portion 16 that surrounds an outward opening end of the injection valve mounting hole 10, the fuel nozzle cylinder part 6 of the fuel injection valve I is fitted into the injection valve mounting hole 15, and the sealing and cushion member 10) is accommodated in the recessed portion 16.

On an outer peripheral surface of the fuel inlet cylinder part 7, an annular groove 17 that a front end surface of the fuel distribution cap 4 faces is provided adjacent to the electromagnetic coil part 8, and an elastic support member 18 that resiliently presses the front end surface of the fuel distribution cap 4 is attached to the annular groove 17, whereby the fuel injection valve I is resiliently sandwiched between the cylinder head Eh and the fuel distribution cap 4.

Figure 2:
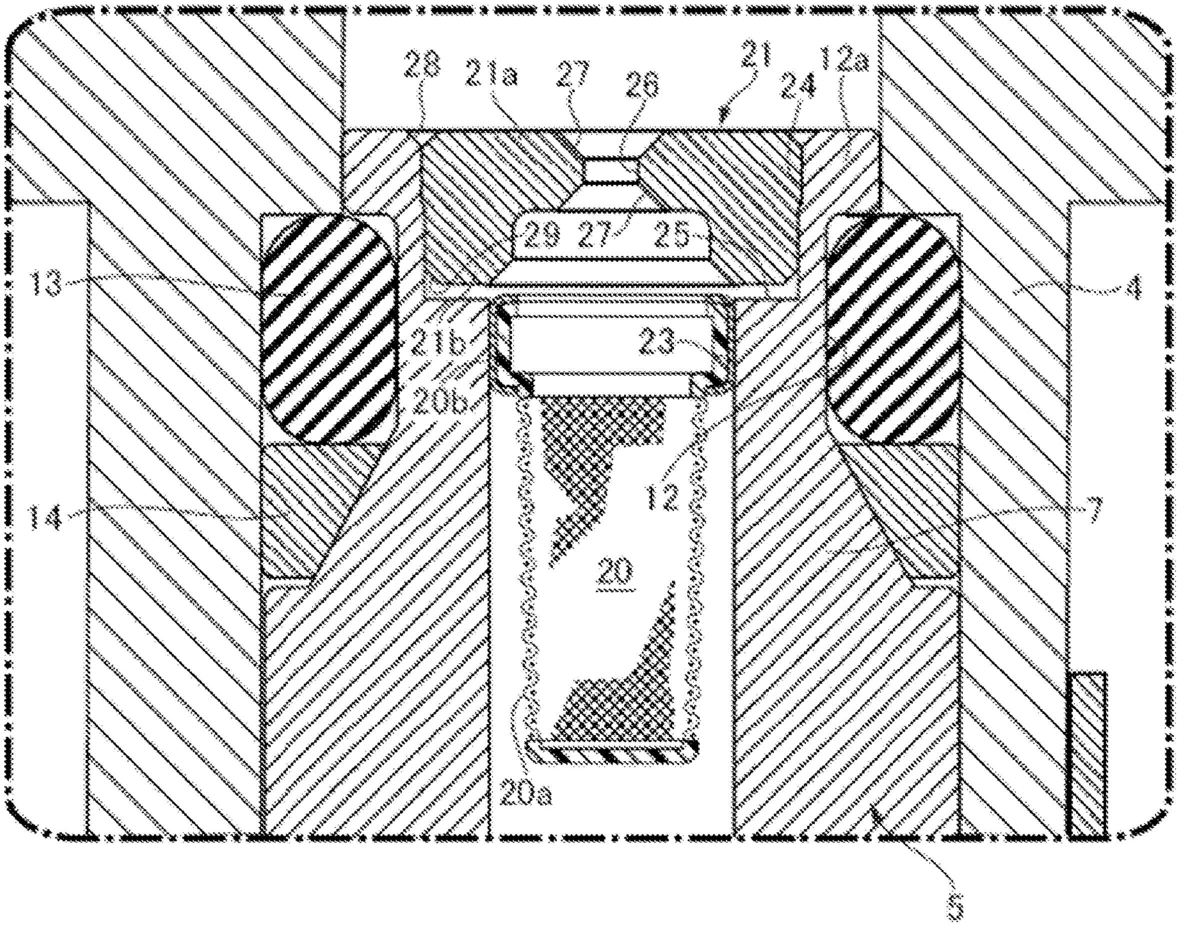
FIG. 2 is an enlarged sectional view of a portion of an arrow 2 of FIG. 1.
Figure 3:
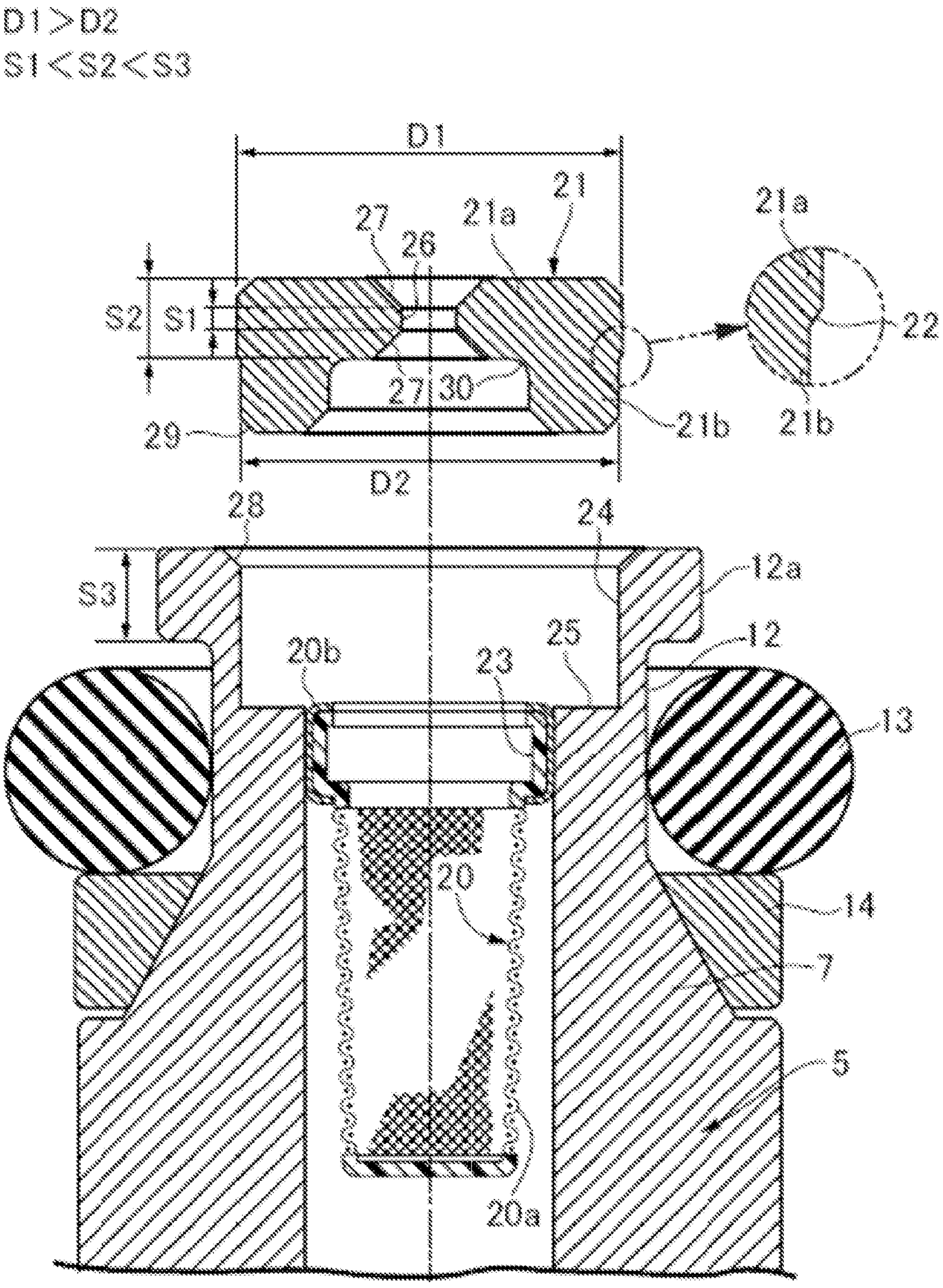
FIG. 3 is an exploded longitudinal sectional view of a fuel inlet cylinder and an orifice member in FIG. 2.

In FIG. 2, a fuel filter 20 and an orifice member 21 are fixed to an inner peripheral surface of the fuel inlet cylinder part 7 from the inlet thereof by sequential press-fitting with the fuel filter 20 as a leading end. The fuel filter 20 and the orifice member 21 are disposed axially adjacent to each other in this manner.

Next, the press-fitting structure of the fuel filter 20 and the orifice member 21 onto the inner peripheral surface of the fuel inlet cylinder part 7 will be described with reference to FIGS. 2 and 3.

A first press-fitted cylindrical surface 23 and a second press-fitted cylindrical surface 24 coaxially contiguous with an outer end of the first press-fitted cylindrical surface 23 via a stepped part 25 and having a larger diameter than that of the first press-fitted cylindrical surface 23 are formed on the inner peripheral surface of the fuel inlet cylinder part 7, and the second press-fitted cylindrical surface 24 is open to a rear end surface of the fuel inlet cylinder part 7, that is, an inlet end surface, via a chamfer 28.

Meanwhile, the fuel filter 20 includes an elongated filter basket 20*a* and a metal attachment ring 20*b* coupled to an open end of the filter basket 20*a*, and the filter basket 20*a* allows the introduced fuel of the fuel inlet cylinder part 7 to be filtered.

The orifice member 21 includes a disc-shaped orifice body part 21*a* having an orifice 26 penetrating through a center part to communicate with an inside and an outside of the orifice member 21 and a press-fitting guide cylinder part 21*b* cylindrically protruding from an outer peripheral portion of one end surface of the orifice body part 21*a*. In this case, an outer diameter D2 of the press-fitting guide cylinder part 21*b* is set to be slightly smaller (for example, 0.1 mm) than an outer diameter D1 of the orifice body part 21*a*, and outer peripheral surfaces thereof are connected to each other via a tapered step portion 22. In addition, a chamfer 29 is applied to an outer peripheral edge of a tip part of the press-fitting guide cylinder part 21*b*. Further, an inner side surface of the orifice body part 21*a* and an inner peripheral surface of the press-fitting guide cylinder part 21*b* are continuously connected to each other via a concave curved surface 30.

The orifice body part 21*a* is configured such that a wall thickness S2 thereof is larger than an axial length S1 of the orifice 26. In order to achieve this, a pair of tapered holes 27 with large-diameter portions open to both end surfaces of the orifice body part 21*a* are connected to both ends of the orifice 26.

In assembling the fuel filter 20 and the orifice member 21 to the fuel inlet cylinder part 7, first, the filter basket 20*a* of the fuel filter 20 is inserted into the fuel inlet cylinder part 7, and the attachment ring 20*b* is set at the inlet of the first press-fitted cylindrical surface 23. Next, the attachment ring 20*b* is pushed into the first press-fitted cylindrical surface 23 with a predetermined press-fit tolerance in a state in which facing end surfaces of the orifice member 21 and the fuel filter 20 abut, while the orifice member 21 is press-fitted onto the second press-fitted cylindrical surface 24.

Meanwhile, in a case where the orifice member 21 is press-fitted onto the second press-fitted cylindrical surface 24, first, the press-fitting guide cylinder part 21*b* is fitted to or lightly press-fitted onto the second press-fitted cylindrical surface 24 to ensure coaxiality between the second press-fitted cylindrical surface 24 and the orifice member 21. Subsequently, the orifice body part 21*a* is press-fitted onto the second press-fitted cylindrical surface 24 with a predetermined press-fit tolerance larger than the press-fit tolerance of the attachment ring 20*b*.

By doing this, the orifice body part 21*a* can be properly press-fitted onto the second press-fitted cylindrical surface 24 with a predetermined press-fit tolerance without being tilted. In this case, the press-fitting guide cylinder part 21*b* is kept from abutting on the stepped part 25 such that the press-fitting load of the orifice member 21 is not applied to the stepped part 25 between the first and second press-fitted cylindrical surfaces 23 and 24.

The distortion that occurs in the first and second press-fitted cylindrical surfaces 23 and 24 due to the press-fitting of the attachment ring 20*b* and the orifice member 21 is blocked at the stepped part 25 by the stepped part 25 existing between the first press-fitted cylindrical surface 23 and the larger-diameter second press-fitted cylindrical surface 24, and there is no interference therebetween. Therefore, a predetermined press-fit tolerance of the attachment ring 20*b* with respect to the first press-fitted cylindrical surface 23 and a predetermined press-fit tolerance of the orifice body part 21*a* with respect to the second press-fitted cylindrical surface 24 can be properly maintained without interfering with each other. In particular, even in a case where significant distortion occurs in the second press-fitted cylindrical surface 24 due to the press-fitting of the orifice body part 21*a* onto the second press-fitted cylindrical surface 24 with a large press-fit tolerance, the fuel filter 20) can be reliably fixed to the inner peripheral surface of the fuel inlet cylinder part 7 without affecting the press-fit tolerance of the attachment ring 20*b* previously press-fitted onto the first press-fitted cylindrical surface 23.

In addition, a flange-shaped outer side end wall 12*a* of the seal groove 12 is integrally formed on the fuel inlet cylinder part 7 so as to face the rear end surface of the fuel inlet cylinder part 7 and is disposed to occupy a concentric position with the orifice body part 21*a* press-fitted onto the second press-fitted cylindrical surface 24, that is, to surround the orifice body part 21*a*, and a wall thickness S3 of the outer side end wall 12*a* is set to be thicker than the wall thickness S2 of the orifice body part 21*a*. Consequently, the rigidity of a portion of the second press-fitted cylindrical surface 24 onto which the orifice body part 21*a* is press-fitted can be effectively reinforced by the outer side end wall 12*a*. Therefore, the orifice body part 21*a* can be accurately press-fitted onto the second press-fitted cylindrical surface 24 with a predetermined press-fit tolerance.

In addition, the outer side end wall 12*a* being disposed to surround the orifice body part 21*a* press-fitted onto the second press-fitted cylindrical surface 24, and the wall thickness S3 of the outer side end wall 12*a* being set to be larger than the wall thickness S2 of the orifice body part 21*a* mean that the orifice body part 21*a* and the groove bottom of the seal groove 12 are axially shifted. Therefore, since the distortion of the second press-fitted cylindrical surface 24 due to the press-fitting of the orifice body part 21*a* does not propagate to the seal groove 12, a good sealing state can be maintained between the seal groove 12 and the O-ring 13.

Further, the fuel filter 20 and the orifice member 21 are respectively press-fitted onto the first press-fitted cylindrical surface 23 and the second press-fitted cylindrical surface 24 in a state in which the facing end surfaces of the fuel filter 20 and the orifice member 21 abut. Therefore, even in a case where foreign matter such as burrs occurs within the second press-fitted cylindrical surface 24 due to the press-fitting of the orifice member 21 onto the second press-fitted cylindrical surface 24, such foreign matter is blocked at the abutting portion of the fuel filter 20 and the orifice member 21 to prevent the entry of the foreign matter into the fuel filter 20, which makes it possible to avoid clogging of the filter basket 20*a*.

When the pulsation of fuel pressure generated in the fuel rail pipe 2 propagates to the fuel inlet cylinder part 7 during the operation of the engine E, the constriction action of the orifice 26 of the orifice member 21 attenuates the pulsation, which makes it possible to prevent changes in the fuel injection amount from the fuel nozzle cylinder part 6 to the combustion chamber Ec due to the pulsation.

Meanwhile, since the orifice body part 21*a* having the orifice 26 at the center part has the wall thickness S2 larger than the axial length S1 of the orifice 26 and has high rigidity, the press-fitting of the orifice body part 21*a* onto the second press-fitted cylindrical surface 24 does not cause distortion in the orifice 26, which makes it possible to stabilize the pulsation attenuation function.

Further, in the orifice body part 21*a*, since alternating compressive load and tensile load are repeatedly received due to the alternating action of a high-pressure wave and a low-pressure wave of pulsation during the pulsation attenuation action of the orifice 26, there is a tendency for concentrated stress to occur in the connection portion between the orifice body part 21*a* and the press-fitting guide cylinder part 21*b* fixed to the fuel inlet cylinder part 7. However, the inner side surface of the orifice body part 21*a* and the inner peripheral surface of the press-fitting guide cylinder part 21*b* are continuously connected via the concave curved surface 30 to disperse the concentrated stress at the portion of the concave curved surface 30, which makes it possible to enhance the durability of the orifice member 21.

Although the embodiments of the present invention have been described above, the present invention is not limited to the above embodiments, and various design changes can be made without departing from the present invention described in the scope of the claims.

DESCRIPTION OF REFERENCE NUMERALS

I: electromagnetic fuel injection valve
D1: outer diameter of orifice body part
D2: outer diameter of press-fitting guide cylinder part
S1: length of orifice
S2: wall thickness of orifice body part
S3: wall thickness of outer side end wall of seal groove
2: fuel rail pipe
3: fuel pump
4: fuel distribution cap
5: valve housing
6: fuel nozzle cylinder part
7: fuel inlet cylinder part
12: seal groove
13: sealing member (O-ring)
20: fuel filter
21: orifice member
21*a*: orifice body part
21*b*: press-fitting guide cylinder part
23: first press-fitted cylindrical surface
24: second press-fitted cylindrical surface
25: stepped part
26: orifice
30: concave curved surface

The invention claimed is:

1. An electromagnetic fuel injection valve, in which a fuel distribution cap branched from a fuel rail pipe is fitted onto an outer periphery of a fuel inlet cylinder part of a valve housing of the fuel injection valve via a sealing member, a fuel filter and an orifice member axially adjacent to each other are sequentially press-fitted onto an inner peripheral surface of the fuel inlet cylinder part from an inlet side of the fuel inlet cylinder part, an annular seal groove in which the sealing member is mounted is provided on an outer peripheral surface of the fuel inlet cylinder part, and the orifice member has an orifice communicating with an inside and an outside of the orifice member, wherein a first press-fitted cylindrical surface onto which the fuel filter is press-fitted, and a second press-fitted cylindrical surface contiguous with an outer end of the first press-fitted cylindrical surface via a stepped part and having a larger diameter than that of the first press-fitted cylindrical surface and onto which the orifice member is press-fitted are formed on the inner peripheral surface of the fuel inlet cylinder part, wherein the orifice member includes a disc-shaped orifice body part having a wall thickness larger than a length of the orifice and press-fitted onto the second press-fitted cylindrical surface, and a press-fitting guide cylinder part cylindrically protruding from an outer peripheral portion of one end surface of the orifice body part, having an outer diameter smaller than an outer diameter of the orifice body part, and fitted to the second press-fitted cylindrical surface prior to the orifice body part, and a flange-shaped outer side end wall of the seal groove is integrally formed on the fuel inlet cylinder part so as to surround the orifice body part.

2. The electromagnetic fuel injection valve according to claim 1, wherein the outer side end wall has a wall thickness larger than the wall thickness of the orifice body part.

3. The electromagnetic fuel injection valve according to claim 1, wherein an inner side surface of the orifice body part and an inner peripheral surface of the press-fitting guide cylinder part are connected to each other via a concave curved surface.

4. The electromagnetic fuel injection valve according to claim 1, wherein the fuel filter and the orifice member are respectively press-fitted onto the first press-fitted cylindrical surface and the second press-fitted cylindrical surface in a state in which facing end surfaces of the fuel filter and the orifice member abut.

* * * * *